United States Patent
Schweizer et al.

(10) Patent No.: US 9,242,422 B2
(45) Date of Patent: Jan. 26, 2016

(54) QUICK-CONNECT COUPLING

(75) Inventors: Beat Schweizer, Titterten (CH); Martin Moritz, Landser (FR)

(73) Assignee: VON ARX AG, Sissach (CH)

( * ) Notice: Subject to any disclaimer, the term of this patent is extended or adjusted under 35 U.S.C. 154(b) by 398 days.

(21) Appl. No.: 13/449,821

(22) Filed: Apr. 18, 2012

(65) Prior Publication Data

US 2012/0319399 A1     Dec. 20, 2012

(30) Foreign Application Priority Data

Jun. 16, 2011   (CH) ........................................ 1007/11

(51) Int. Cl.
| | |
|---|---|
| *B23B 31/16* | (2006.01) |
| *B30B 15/02* | (2006.01) |
| *B23B 31/107* | (2006.01) |
| *B25B 23/00* | (2006.01) |
| *B26D 7/26* | (2006.01) |

(Continued)

(52) U.S. Cl.
CPC ........... *B30B 15/026* (2013.01); *B23B 31/1071* (2013.01); *B25B 23/0035* (2013.01); *B26D 7/2614* (2013.01); *B26F 1/40* (2013.01); *F16B 21/165* (2013.01)

(58) Field of Classification Search
CPC .............. B30B 15/026; B25B 23/0035; B23B 31/1071; B26D 7/2614; F16B 21/165; B26F 1/40
USPC ................. 285/316, 86; 279/75, 22; 408/240; 403/322.2, DIG. 4
See application file for complete search history.

(56) References Cited

U.S. PATENT DOCUMENTS

| 68,567 | A | | 9/1867 | Koyl | |
|---|---|---|---|---|---|
| 2,255,333 | A | * | 9/1941 | Scheiwer | ................... 251/149.6 |
| 2,255,695 | A | * | 9/1941 | Bull | ................... 403/6 |

(Continued)

FOREIGN PATENT DOCUMENTS

| DE | 1108528 | 6/1961 |
|---|---|---|
| DE | 2426760 A1 | 1/1975 |

(Continued)

OTHER PUBLICATIONS

Final Office Action dated Oct. 16, 2014 for U.S. Appl. No. 13/440,821.

(Continued)

*Primary Examiner* — Michael P Ferguson
*Assistant Examiner* — Jay R Ripley
(74) *Attorney, Agent, or Firm* — Paul D. Bianco; Gary S. Winer; Fleit Gibbons Gutman Bongini & Bianco PL

(57) ABSTRACT

A quick-connect coupling for connecting an exchangeable head to a pressing device has balls K1 with a diameter D1, which are radially movably disposed in a ball-holding part on the pressing device. Balls K1 being held radially fixed in a groove on the head with a depth N1 by a locking ring in the connected state. The head has a further peripheral groove with a depth N2. The further groove is designed to hold part of further balls K2 with a diameter D2, wherein the balls K2 are likewise disposed in a radially movable manner in the ball-holding part and wherein the diameter D2 is greater than the diameter D1. The diameter D1 is the same or smaller than the difference between the diameter D2 and the groove depth N2.

18 Claims, 3 Drawing Sheets

(51) Int. Cl.
   *B26F 1/40*   (2006.01)
   *F16B 21/16*  (2006.01)

(56) References Cited

U.S. PATENT DOCUMENTS

| | | | |
|---|---|---|---|
| 3,190,168 A * | 6/1965 | Sullivan | 411/348 |
| 3,583,715 A | 6/1971 | Jarhl | |
| 3,937,055 A | 2/1976 | Caruso et al. | |
| 3,947,047 A | 3/1976 | Hultman | |
| 4,107,949 A | 8/1978 | Wanner | |
| 4,111,592 A | 9/1978 | Schnitzler | |
| RE31,755 E | 12/1984 | Wanner | |
| 5,003,847 A | 4/1991 | Wagner | |
| 5,209,153 A | 5/1993 | Araki et al. | |
| 5,253,554 A | 10/1993 | Riera et al. | |
| 5,730,022 A | 3/1998 | Hansson et al. | |
| 5,957,634 A | 9/1999 | Carpinetti | |
| 6,290,606 B1 * | 9/2001 | Hodson | 464/159 |
| 6,324,768 B1 | 12/2001 | Wellman | |
| 6,324,884 B1 | 12/2001 | Barjesteh et al. | |
| 6,461,089 B2 | 10/2002 | Adrian et al. | |
| 6,511,268 B1 | 1/2003 | Vasudeva | |
| 6,718,870 B1 | 4/2004 | Frenken | |
| 6,953,196 B1 * | 10/2005 | Huang | 279/75 |
| 7,140,817 B1 * | 11/2006 | Phillips et al. | 409/182 |
| 7,520,495 B2 | 4/2009 | Stark | |
| 7,641,415 B2 * | 1/2010 | Fox et al. | 403/322.2 |
| 7,839,053 B2 * | 11/2010 | Hamasaki et al. | 310/323.01 |
| 8,636,287 B2 | 1/2014 | Wienhold | |
| 2002/0017753 A1 | 2/2002 | Adrian et al. | |
| 2004/0161313 A1 | 8/2004 | Nordlin | |
| 2005/0120770 A1 | 6/2005 | Frenken | |
| 2007/0063403 A1 | 3/2007 | Stark | |
| 2009/0290931 A1 * | 11/2009 | Blanchard | 403/204 |
| 2010/0005849 A1 | 1/2010 | College | |
| 2012/0319398 A1 | 12/2012 | Schweizer et al. | |
| 2012/0319399 A1 | 12/2012 | Schweizer | |
| 2014/0260505 A1 | 9/2014 | Bowles et al. | |

FOREIGN PATENT DOCUMENTS

| | | |
|---|---|---|
| DE | 2614531 A1 | 10/1976 |
| DE | 2551125 | 5/1977 |
| DE | 2551125 A1 | 5/1977 |
| DE | 1108528 B | 9/1977 |
| DE | 2614532 B1 | 9/1977 |
| DE | 20012706 U1 | 9/2000 |
| DE | 10046869 A1 | 4/2002 |
| DE | 20312887 U1 | 10/2003 |
| DE | 202009010128 U1 | 10/2009 |
| EP | 0253177 | 1/1988 |
| EP | 1084798 | 3/2001 |
| EP | 1084798 A2 | 3/2001 |
| EP | 1244187 | 9/2002 |
| EP | 2535128 | 12/2012 |
| FR | 2437910 A1 | 4/1980 |
| FR | 2649028 A1 | 1/1991 |
| JP | 3042199 A | 2/1991 |
| WO | 98/47653 | 10/1998 |
| WO | 2004/091862 | 10/2004 |
| WO | 2004/091862 A2 | 10/2004 |
| WO | 2010/128131 | 11/2010 |
| WO | 2010/128131 A2 | 11/2010 |
| WO | 2012171732 | 12/2012 |
| WO | 2013152549 | 10/2013 |
| WO | 2014/193765 | 12/2014 |

OTHER PUBLICATIONS

Written Opinion of the International Searching Authority dated Dec. 16, 2013 for PCT/EP2012/058767 filed May 11, 2012.
International Search Report completed Sep. 18, 2012 for PCT/EP2012/058767 filed May 11, 2012.
International Preliminary Report on Patentability dated Dec. 17, 2013 for PCT/EP2012/058767 filed May 11, 2012.
Office Action dated Jan. 9, 2015 for U.S. Appl. No. 13/449,770.
International Search Report dated Oct. 3, 2014 for PCT/US2014/039473.

* cited by examiner

QUICK-CONNECT COUPLING

CROSS REFERENCE TO RELATED APPLICATIONS

This application claims priority to Swiss Patent Application No. CH-01007/11 filed Jun. 16, 2011 the contents of which are incorporated herein by reference.

FIELD OF THE INVENTION

The invention relates to a quick-connect coupling for connecting an exchangeable head to a pressing device.

BACKGROUND OF THE INVENTION

Pressing devices are used for various purposes, such as, for example, pressing cable shoes onto electrical cables, but also for cutting cables or punching holes into sheet metal constructions. In order to perform these different applications on one machine, an exchangeable head system is required. To simplify matters, the different mountable heads are referred to in the following as exchangeable heads. Using the same pressing device with different exchangeable heads, it is quick and easy to change over to different applications where necessary.

However, a particular problem affecting pressing devices with exchangeable heads is the longitudinal forces being transmitted, in other words, the compressive forces produced by the pressing devices, because the coupling mechanism by which the exchangeable head is attached to the pressing device naturally has to withstand these forces and the corresponding safety requirements are relatively high. It is advantageous, therefore, to find a coupling mechanism that can be handled quickly and easily and yet offers operational safety, even with high and very high longitudinal forces.

Quick-connect coupling mechanisms are known per se. A quick-connect coupling mechanism used particularly frequently for torque transmission, especially in the field of hand machine tools, employs a solution with movable locking bodies, usually balls, which engage with corresponding grooves in the exchangeable tool in the connected state. An example of this is known from DE-2 551 125, whereby percussion drills are held in a tool holder on a machine tool in an easily exchangeable manner. Although longitudinal forces are naturally also active here, these are compressive forces (seen in relation to the machine tool/tool connection), so that there is no risk of the quick-connect coupling being released under load by the longitudinal forces and thereby representing a safety risk.

However, solutions are also known in which the same functional principle is also used with quick-connect couplings, where longitudinal forces are active, which represent traction forces in relation to the parts being connected. An example of this sort of connection is disclosed in DE-1 108 528. This specification shows a valve coupling for hose lines and pipelines. In this case, a coupling sleeve exhibits radial wall bores in which radially movable balls are disposed, which may project into a peripheral groove of a coupling plug. A spring-mounted locking sleeve prevents the balls from slipping out of the peripheral groove. Because this is an application in which pressurised fluids are conducted through connectable lines, although there is a certain safety risk, because evidently no applications involving very high fluid pressures are envisaged, additional measures do not seem necessary.

The situation is different, however, when the same functional principle is to be used in a quick-connect coupling to connect an exchangeable head to a powerful pressing device. Because relatively high pressures are used in this case (for example>50 kN), special additional measures are needed in order to guarantee safety and reliability.

SUMMARY OF THE INVENTION

It is an object of the present disclosure, therefore, to indicate a quick-connect coupling with loading capacity to connect an exchangeable head to a pressing device, wherein the quick-connect coupling is based on the known construction principle with movable locking bodies in the form of balls, which engage in corresponding grooves in an exchangeable head in the coupled state. This quick-connect coupling should endure high longitudinal traction forces on a sustained basis and, if possible, without wear and guarantee a high degree of safety.

A further object involves the quick-connect coupling specified being designed in such a way that it is impossible for the pressing device and the interchangeable head to be wrongly assembled.

The present disclosure involves in principle the use in a generic quick-connect coupling of a further peripheral groove on the exchangeable head, on the one hand, and a greater number of locking bodies (balls) and, on the other hand, a form being provided on the other side on a shaft section of the exchangeable head, which is disposed closer to the pressing device and makes locking impossible if the exchangeable head is used in the wrong position.

In accordance with the disclosure, a generic quick-connect coupling between a first and a second component should be taken to mean the following in this case: In a ball-holding part on a first component (in this case the pressing device), a number of balls $K1$ with a diameter $D1$ is radially movably disposed. On a second component (in this case the exchangeable head) a peripheral groove with a groove depth $N1$ to partially hold the balls $K1$ is present on a shaft part in an area with a shaft radius $R1$ with the first and second components in a connected state. In this case, a locking ring is movably attached to the ball-holding part in an axial direction and in a spring-mounted manner, the balls $K1$ being held radially fixed in the peripheral groove by said locking ring when the first and second component are in the connected state.

More particularly, in accordance with the disclosure, it is provided that:

on the shaft section of the exchangeable head there is a further peripheral groove, which is disposed closer to the pressing device in an axial direction, namely at a distance d from the peripheral groove, the further peripheral groove is designed to hold further balls K, wherein the further balls K are likewise disposed in a radially movable manner in the ball-holding part and wherein the further balls K are likewise spaced at a distance d, and the shaft section is disposed in an area that is closer to the pressing device in an axial direction and is likewise spaced at a distance d from the further peripheral groove, exhibits a form A that prevents the further balls K from moving radially when contact is made with the further balls K and thereby prevents the locking ring from moving.

By using a further peripheral groove and with the associated use of a larger number of locking bodies (balls), it is possible to achieve the transmission of smaller forces per locking body (ball), or else the transmission of greater forces using the same measure. The form A on the shaft section of the exchangeable head mean that if the exchangeable head is not completely inserted into the ball-holding part on the pressing device, a fixed connection cannot be made (in other words, a connection in which power is only transmitted across a single peripheral groove and the locking bodies engaging with it). Non-lockability in the event of incorrect assembly is notably important, because this is exactly what must be completely and reliably prevented, due to the associated risks (breakage of the quick-connect coupling when there is a build-up of pressure). The present disclosure has the added advantage that an embodiment functions purely mechanically and does not require electronic monitoring.

It has also emerged that with two peripheral grooves and a total of at least 12 balls—and of course using tool steels that are sufficiently hard and tough to avoid lasting deformation—the specified longitudinal forces in the region of 60 kN can be reliably transmitted.

Also advantageous is an angularly offset arrangement of the balls K in the peripheral groove compared with the further balls K in the further peripheral groove. The forces can thereby be more effectively distributed over the entire cross-section.

A further advantage is also that an arrangement of the embodiment facilitates the unlimited twistability of the exchangeable head in relation to the pressing device.

A further measure that ensures that the quick-connect coupling is able to withstand high longitudinal traction forces on a sustained basis and with as little wear as possible, involves the peripheral grooves each being provided with a base surface and side faces, namely in such a way that the balls K and the further balls K have a point contact with the base surface and the side faces in the connected state and that the point contact with the side face is made roughly in the region of the half groove depth N. This means that the locating point of the balls is moved from the entry edge of the peripheral grooves sensitive to deformation towards the entry centre of the peripheral grooves, which significantly increases wear resistance.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Figure 1:
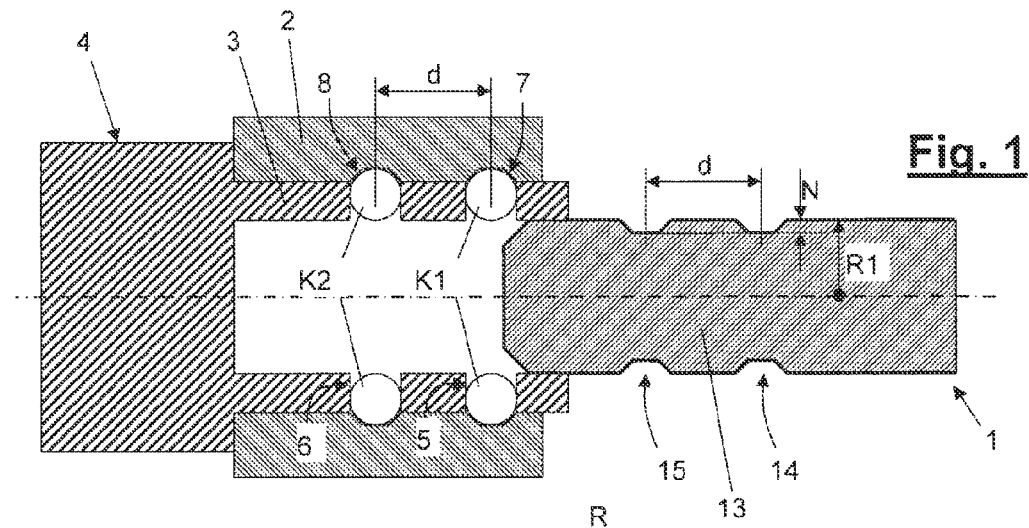
FIG. 1 shows a theoretical sectional drawing of an exchangeable head not yet inserted in the quick-connect coupling with the locking ring in an unlocked position.

FIG. 1 shows a theoretical sectional drawing of an exchangeable head 1 not yet inserted in the quick-connect coupling with a locking ring 2 in an unlocked position. In this case, the locking ring 2 and a ball-holding part 3 are parts of the quick-connect coupling, which are connected to a pressing device 4. In the ball-holding part 3, balls K1 with a diameter D1 and further balls K2, likewise with the diameter D1, are disposed in ball guides 5, 6 such that they are radially movable. The balls K1, K2 act as movable locking bodies. In addition, the balls K1, K2 and the ball guides 5, 6 are distributed over the periphery of the ball-holding part 3. Furthermore, the ball-holding part 3 and the exchangeable head 1 are adjusted to one another, such that there is a sliding fit. Special shaping (see FIG. 4) of the ball guides 5, 6 on the inside of the ball-holding part 3 also prevents the balls K1, K2 from falling out when the exchangeable head 1 is not inserted or not inserted fully.

The locking ring 2 is mounted on the ball-holding part 3 in an axially movable manner. The locking ring 2 has locating grooves 7, 8 on the inside, which are formed so that the balls K1, K2 can move away into the locating grooves 7, 8 when the locking ring 2 is in the unlocked position—as shown here—and thereby avoid obstructing the insertion of the exchangeable head 1. Not shown in this figure is a spring element 9 that is mounted between the ball-holding part 3 and the locking ring 2 and permanently tries to press the locking ring 2 in an axial direction into the locking position (see FIG. 3). In order to achieve the unlocked position of the locking ring 2, as shown, the locking ring 2 must therefore be moved into this position manually by means of a gripping bar (not shown).

Since the quick-connect coupling described creates a mechanically secure, but detachable connection between the pressing device 4 and the exchangeable head 1 and the pressing device 4 transmits compressive forces onto the exchangeable head 1, there is a plunger within the pressing device 4, via which pressure is transmitted onto an axially spring-mounted connecting rod within the exchangeable head 1 during operation by means of a contact surface on the plunger tip. To simplify the theoretical illustration and because they are not basically needed in order to understand the quick-connect coupling, these elements are not shown here. During operation, however, the quick-connect coupling is exposed to high axial forces with this sort of use, which act as traction forces and pull the pressing device 4 and the exchangeable head 1 apart.

The exchangeable head 1 has a shaft part 13 with a shaft radius R1. The shaft radius R1 of the exchangeable head 1 corresponds to the inside radii of the ball-holding part 3, naturally with corresponding tolerances for an easy-to-use sliding fit, because various exchangeable heads must be attachable to the pressing device.

The exchangeable head 1 has a peripheral groove 14 with a groove depth N in the area of the shaft part 13 with the shaft radius R1. The peripheral groove 14 serves the partial holding of balls K1 with the pressing device 4 and the exchangeable head 1 in the connected state. The shaft part 13 has a further peripheral groove 15, likewise with the groove depth N and likewise in the area of the shaft part 13 with the shaft radius R1. The peripheral groove 15 serves to partially hold the balls K2 with the pressing device 4 and the exchangeable head 1 in the coupled state. The further peripheral groove 15 is disposed in the axial direction closer to the pressing device 4. In addition, the peripheral groove 14 and the further peripheral groove 15 naturally have the same axial spacing as the balls K1 and K2 in the ball-holding part, namely at a distance d.

Based on the sizes introduced, it is easy to establish that with the proposed structural form with balls K1, K2 of the same size (i.e. the same diameter D1) and the same groove depth N for both grooves 14, 15, the following general relationship exists: $R1-N+D1=C$ (a constant). This is particularly clear from FIG. 3.

Figure 2:
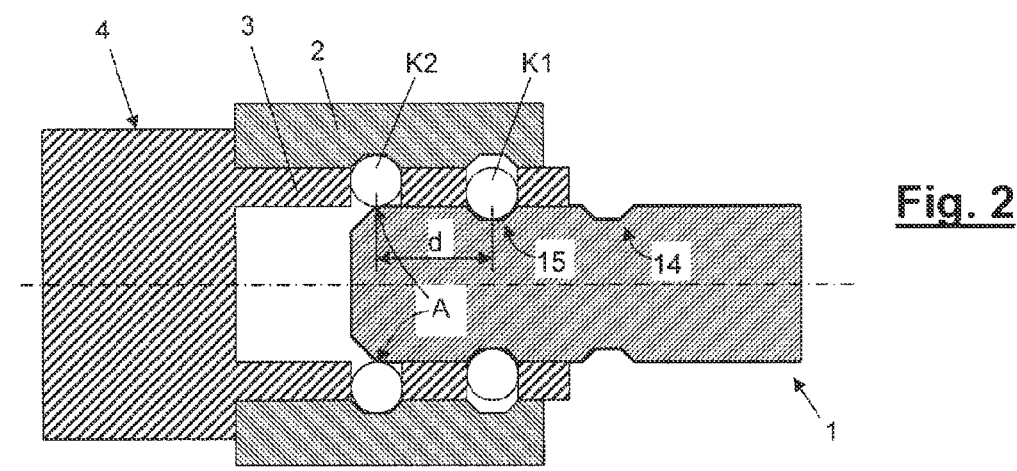
FIG. 2 shows a theoretical sectional drawing of an exchangeable head partly inserted in the quick-connect coupling with the locking ring in an unlocked position.

It is also true that with a structure of the type shown with the shaft part 13 in an area disposed closer to the pressing device 4 in an axial direction and at a distance d from the further peripheral groove 15, there is a form A, which prevents the further balls K2 from moving radially when contact is made with the further balls K2 and therefore prevents the locking ring 2 from moving. In this case, the form A is executed in its simplest form as an extension of the shaft part end with a constant radius R1 at least at a distance d from the second peripheral groove 15. Other detail embodiments with the same effect are naturally possible. This form A means that no connection can be made between the exchangeable head 1 and the pressing device 4, in which the transmission of force only takes place via a single peripheral groove and the locking bodies (balls) engaging with it. This means that even in the case illustrated in FIG. 2, where the exchangeable head 1 is only inserted far enough for the further peripheral groove 15 to be located in the area of the balls K1—a position in which the locking ring 2 cannot be pushed into the locking position, due to the form A and the resulting blocking effect of the further balls K2—no fixed connection can be made between the exchangeable head 1 and the pressing device, because the balls K1 can then still move way and are not fixable in the further peripheral groove 15.

Figure 3:
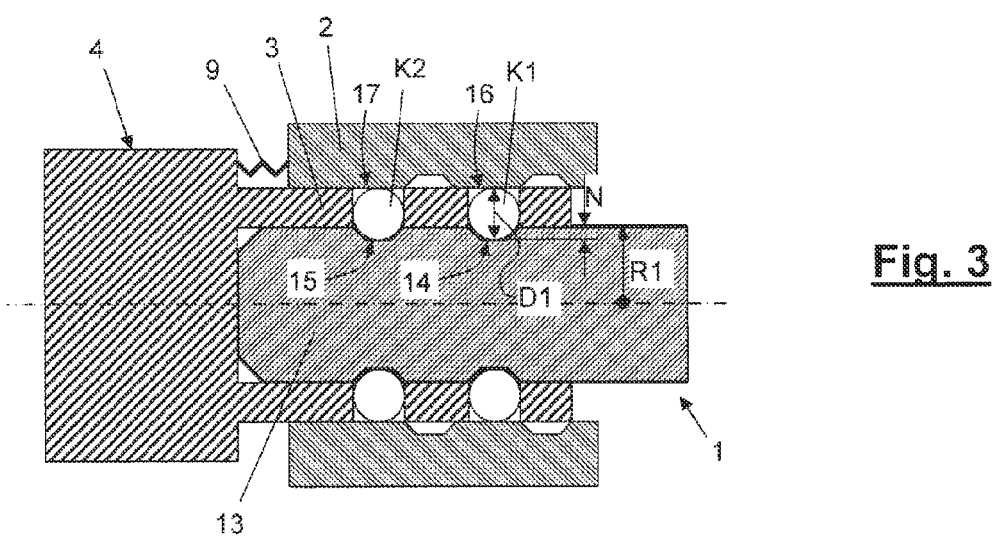
FIG. 3 shows a theoretical sectional drawing of an exchangeable head completely inserted in the quick-connect coupling with the locking ring in a locked position.

FIG. 3 shows a theoretical sectional drawing of an exchangeable head 1 completely inserted in the quick-connect coupling with the locking ring 2 in a locked position. It is made clear here that both the balls K1 and the further balls K2 are fixed in their radial position by stopping surfaces 16, 17 on the locking ring following complete insertion of the exchangeable head 1 and the advancing of the locking ring 2 (which is supported by the spring element 9), such that they have no more freedom of movement and the exchangeable head 1 is therefore locked in the quick-connect coupling. The balls K1, K2 now engage as a fixed locking body both with the shaft part 13 and also with the ball-holding part 3 and therefore prevent reciprocal movement.

Figure 4:
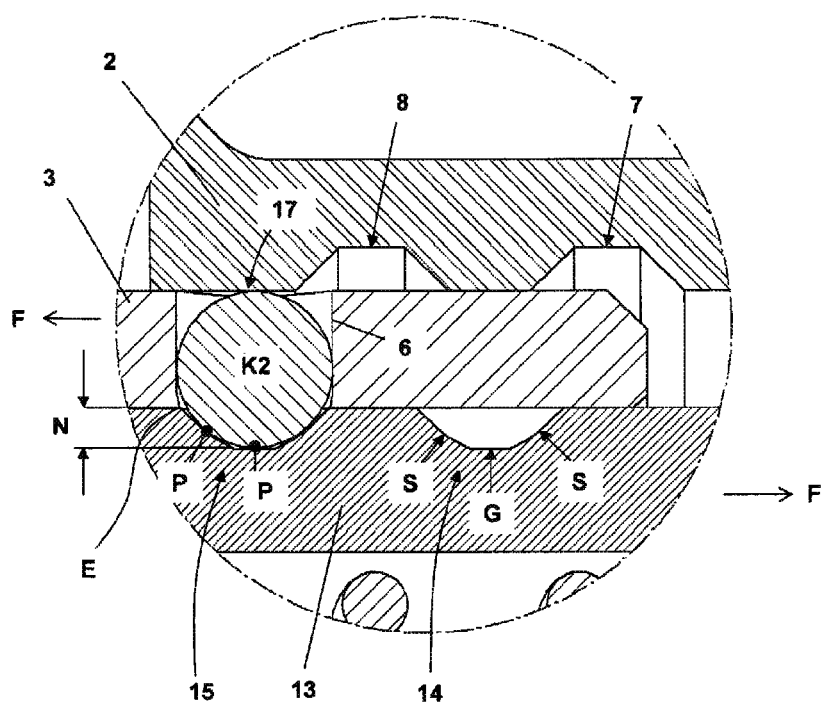
FIG. 4 shows a sectional detail drawing of the quick-connect coupling for the theoretical shaping of the peripheral grooves.

FIG. 4 shows a detail of a sectional drawing of the quick-connect coupling for the theoretical shaping of the peripheral grooves 14, 15. The state shown corresponds to that shown in FIG. 3 and is the same in principle for both peripheral grooves 14, 15. However, due to the staggering and distribution of the balls K1, K2 over the periphery of the peripheral grooves 14, 15, as mentioned earlier, only balls K2 can be seen in this representation. It can clearly be seen here, however, that the peripheral grooves 14, 15 each display a base surface G and side faces S, namely, such that the balls K1, K2 have a point contact with the base surface G and the side face S at locating points P in the connected state and the point contact with the side face occurs in the area of the half groove depth N. In order to achieve the latter, the side faces S may also be divided into several curve sections and neither is it necessary for the individual curve sections to be straight lines. Under load, pressure is therefore transmitted to the contact points P on the side faces S. The entry edges E of the peripheral grooves 14, 15 sensitive to deformation therefore remain unloaded.

However, in order to keep the permanent deformation by balls K1, K2 as small as possible with the great forces anticipated F, tests have revealed that the hardness of the steel used for the shaft part 13 of the exchangeable head 4, for the ball-holding part 3 and for the locking ring 2 must be at least 60 HRC. Apart from the high hardness level, the steels used must also exhibit adequate toughness.

Figure 5:
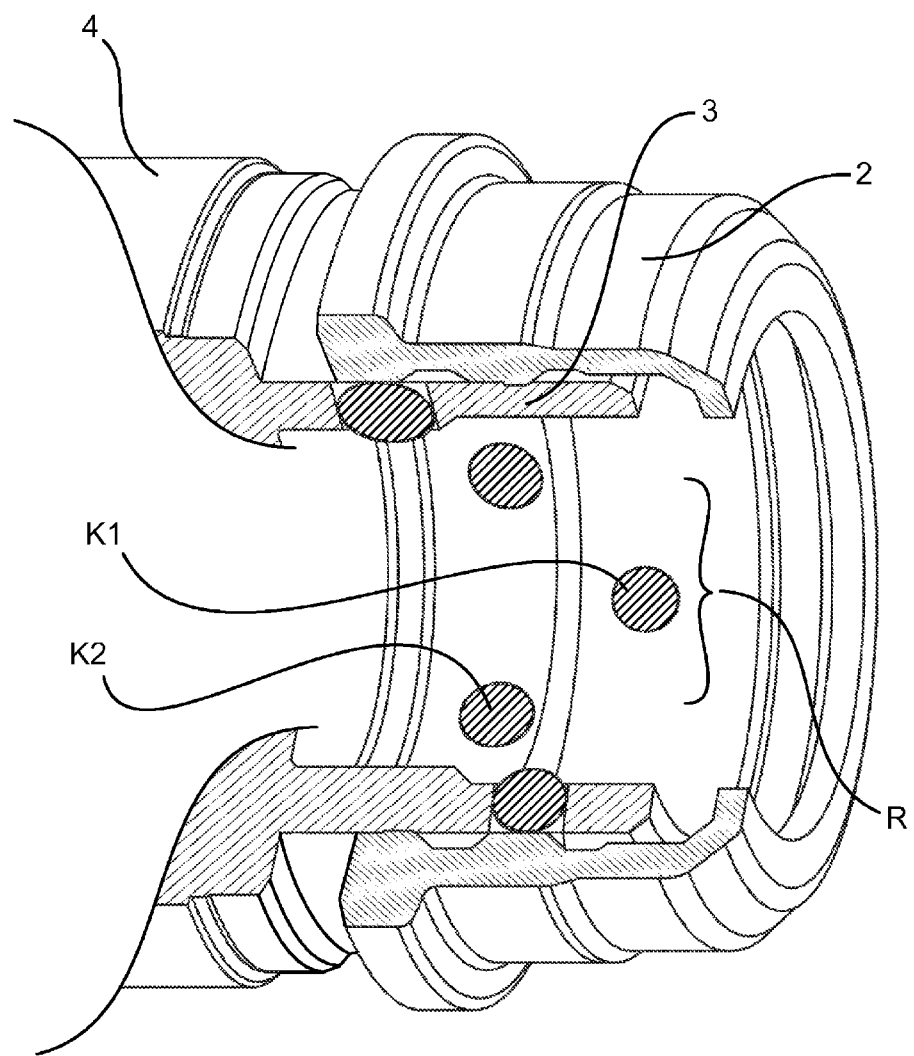
FIG. 5 is a perspective view of the quick-connect coupling of FIGS. 1-4 with a partial cut-out.

FIG. 5 shows one possible angular offset arrangement of the balls K in the peripheral groove compared with the further balls K in the further peripheral groove. The forces can thereby be more effectively distributed over the entire cross-section. Ball K1 is illustrated at a given offset within a range of possible offsets "R" between successive balls K2.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

REFERENCE LIST

1 Exchangeable head
2 Locking ring
3 Ball-holding part
4 Pressing device
5 Ball guide
6 Ball guide
7 Locating groove
8 Locating groove
9 Spring element
10 Not used
11 Not used
12 Not used
13 Shaft part
14 Peripheral groove
15 Further peripheral groove
16 Stopping surface
17 Stopping surface
K1 Balls K2 Further balls
D1 Diameter of the balls
N Groove depth
R1 Shaft radius
G Base surface of a peripheral groove
S Side face of a peripheral groove
P Locating point in the peripheral groove
E Insertion edge of the peripheral groove
F Axial force

What is claimed is:

1. A quick-connect coupling for connecting an exchangeable head to a machine tool device, the coupling comprising:
a plurality of balls;
a circumferential ball-holding part provided on the device, the balls radially movably disposed in the ball-holding part within first and second pluralities of ball guides separated relative to each other by a first distance along an axial length of the coupling;
an exchangeable head including a shaft having first and second peripheral grooves separated relative to each other along the axial length at a distance equal to the first distance, the shaft including a form portion extending along an insertion end of the shaft;
a locking ring attached to the ball-holding part and movable in the axial direction, the pluralities of balls being held radially fixed to engage both the first and second peripheral grooves by said locking ring when the device and the exchangeable head are in a locking state with the shaft inserted to align the first and second pluralities of ball guides with the first and second peripheral grooves, both peripheral grooves and radially fixed plurality of balls thereby configured to bear a load in the locking state, the locking ring including first and second circumferential locating grooves;
the form portion of the shaft having a surface extending from the insertion end of the shaft along an axial length of the shaft to the nearest peripheral groove of the shaft not less than a distance between centers of the first and second peripheral grooves, the surface further having a diameter along the surface length sufficient to contact balls in the first plurality of ball guides to prevent the balls in the first plurality of ball guides from moving axially through their respective ball guides and out of the first locating groove of the locking ring, preventing the locking ring from moving in the axial direction to the locking state, as the shaft is inserted, until the shaft is fully inserted to align both the first and second passages pluralities of ball guides with the first and second peripheral grooves.

2. The coupling of claim 1, the locking ring having:
said first and second circumferential locating grooves disposed in the inner radial surface of the locking ring,
the plurality of balls within both the first and second pluralities of ball guides being held radially fixed by said locking ring to bear a load, and whereby said exchangeable head is locked to the coupling when the first and second circumferential locating grooves are not aligned with the first and second pluralities of ball guides,
the balls within both the first and second guide pluralities of ball guides being radially moveable, and whereby said exchangeable head is not locked to the coupling when the first and second locating grooves are aligned with the first and second pluralities of ball guides.

3. The quick-connect coupling according to claim 1, wherein the first and second peripheral grooves each exhibit a base surface and side faces, the each of the plurality of balls having a point contact with the base surface and the side faces at contact points in the locking state.

4. The quick-connect coupling according to claim 3, wherein the side faces are divided into several sections.

5. The quick-connect coupling according to claim 1, wherein the ball guides of the first plurality of ball guides are disposed angularly offset relative to the ball guides of the second plurality of ball guides.

6. The quick-connect coupling according to claim 5, wherein the first and second peripheral grooves each exhibit a base surface and side faces, the plurality of balls having a point contact with the base surface and the side faces at contact points in the locking state.

7. The quick-connect coupling according to claim 6, wherein the side faces are divided into several sections.

8. The quick-connect coupling according to claim 1, wherein a total of at least 12 balls are distributed within the first and second pluralities of ball guides.

9. The quick-connect coupling according to claim 8, wherein the ball guides of the first plurality of ball guides are disposed angularly offset relative to the ball guides of the second plurality of ball guides.

10. The quick-connect coupling according to claim 8, wherein the first and second peripheral grooves each exhibit a base surface and side faces, the plurality of balls having a point contact with the base surface and the side faces at contact points in the locking state.

11. The quick-connect coupling according to claim 10, wherein the side faces are divided into several sections.

12. The quick-connect coupling according to claim 1, wherein the balls within the first and second pluralities of ball guides are of equal size.

13. The quick-connect coupling according to claim 12, wherein the ball guides of the first plurality of ball guides are disposed angularly offset relative to the ball guides of the second plurality of ball guides.

14. The quick-connect coupling according to claim 12, wherein the first and second peripheral grooves each exhibit a base surface and side faces, the plurality of balls having a point contact with the base surface and the side faces at contact points in the locking state.

15. The quick-connect coupling according to claim 14, wherein the side faces are divided into several sections.

16. A quick-connect coupling for connecting an exchangeable head to a machine tool device, the coupling comprising:
a plurality of balls;
a circumferential ball-holding part provided on the device, the plurality of balls radially movably disposed in the ball-holding part within first and second pluralities of ball guides separated relative to each other by a first distance along an axial length of the coupling,
the first plurality of ball guides angularly offset with respect to the second plurality of ball guides;
a locking ring
attached to the ball-holding part and movable in the axial direction,
the locking ring having first and second circumferential locating grooves,
the balls within both the first and second pluralities of ball guides being held radially fixed by said locking ring to bear a load; and
an exchangeable head including a shaft having a form portion and first and second peripheral grooves, the first and second peripheral grooves separated relative to each other along the axial length at a distance equal to the first distance, the form portion having a surface extending from an insertion end of the shaft along an axial length of the shaft to the nearest peripheral groove of the shaft not less than a distance between centers of the first and second peripheral grooves, the surface further having a diameter along the surface length sufficient to contact balls in the first plurality of ball guides to prevent the balls in the first plurality of ball guides from moving axially through their respective ball guides and out of the first circumferential locating groove of the locking ring, preventing the locking ring from moving in the axial direction to the locking state, as the shaft is inserted, until the shaft is fully inserted to align both the first and second pluralities of ball guides with the first and second peripheral grooves.

17. A quick-connect coupling for connecting an exchangeable head to a machine tool device, the coupling comprising:
an exchangeable head;
a plurality of balls;
a circumferential ball-holding part provided on the device,
  the plurality of balls radially movably disposed in the ball-holding part within first and second pluralities of ball guides separated relative to each other by a first distance along an axial length of the coupling,
  the first plurality of ball guides angularly offset with respect to the second plurality of ball guides;
a locking ring
  attached to the ball-holding part and movable in the axial direction,
  the locking ring having first and second circumferential locating grooves,
  the balls within both the first and second pluralities of ball guides being held radially fixed by said locking ring to bear a load, and whereby the exchangeable head is locked to the coupling when the first and second locating grooves are not aligned with the first and second pluralities of ball guides,
  the balls within both the first and second pluralities of ball guides being radially moveable, and whereby the exchangeable head is not locked to the coupling when the first and second locating grooves are aligned with the first and second pluralities of ball guides; and
a shaft connected to the exchangeable head,
  the shaft having first and second peripheral grooves separated relative to each other along the axial length at a distance equal to the first distance,
  the shaft including a form portion including a surface extending from an insertion end of the shaft along an axial length of the shaft to the nearest peripheral groove of the shaft not less than a distance between centers of the first and second peripheral grooves, the surface further having a diameter along the surface length sufficient to contact balls in the first plurality of ball guides to prevent the balls in the first plurality of ball guides from moving axially through their respective ball guides and out of the first locating groove of the locking ring preventing the locking ring from moving in the axial direction to lock the exchangeable head to the coupling, as the shaft is inserted, until the shaft is fully inserted to align the first and second pluralities of ball guides with the first and second peripheral grooves.

18. The coupling of claim 17, wherein the first and second peripheral grooves each have a base surface and side faces, the plurality of balls having a point contact with the base surface and the side faces at contact points in the locking state to prevent axial movement of the exchangeable head relative to the ball-holding part.

* * * * *